Sept. 20, 1927.
H. R. SAXON
LAMP BRACKET
Original Filed March 10, 1916
1,643,131
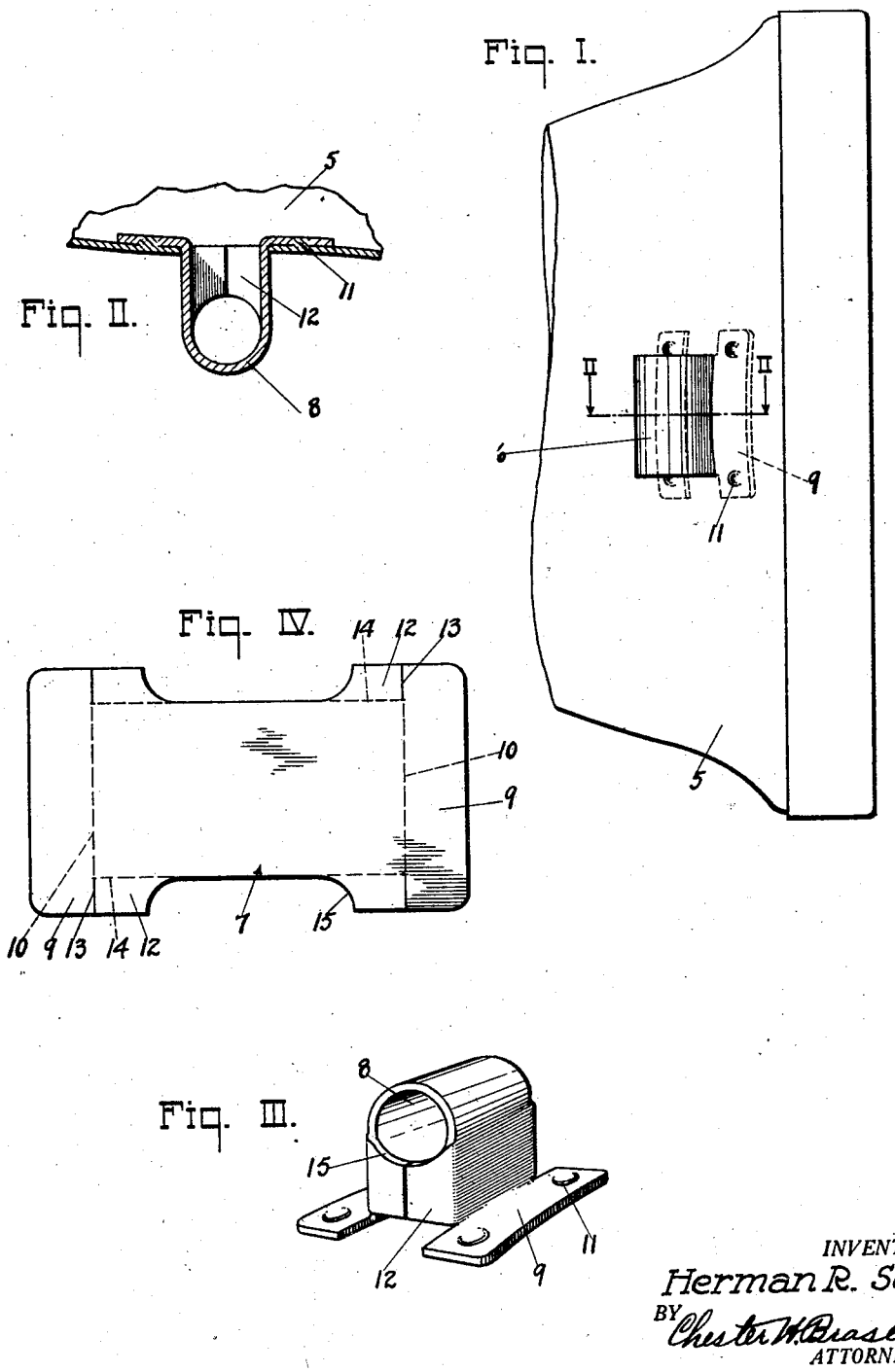
INVENTOR.
Herman R. Saxon.
BY Chester W. Braselton
ATTORNEY Patented Sept. 20, 1927.

1,643,131

UNITED STATES PATENT OFFICE.

HERMAN R. SAXON, OF TOLEDO, OHIO, ASSIGNOR, BY MESNE ASSIGNMENTS, TO THE ELECTRIC AUTO-LITE COMPANY, OF TOLEDO, OHIO, A CORPORATION OF OHIO.

LAMP BRACKET.

Original application filed March 10, 1916, Serial No. 83,315. Divided and this application filed November 15, 1919. Serial No. 338,373.

This invention relates to lamps, such for example as automobile projecting lamps, and more particularly to a mounting bracket for supporting the same.

An object of my invention is the construction of a bracket for supporting such a lamp which shall be simple and cheap to make, light in weight, yet of sufficient strength to firmly support the lamp and readily attachable to the lamp casing.

A further object is the construction of such a bracket from a blank punched out of sheet metal and bent up to form the complete bracket without requiring any machining.

Further objects of this invention relate to economies of manufacture and details of construction as will hereinafter appear from the detailed description to follow.

I accomplish the objects of my invention in the following specification, but it is evident that the same may be widely varied without departing from the scope of the invention as pointed out in the appended claims.

A structure constituting one embodiment of my invention which may be the preferred, is illustrated in the accompanying drawings forming a part thereof in which:

Figure I is a side view of an automobile headlight showing the mounting bracket attached thereto.

Figure II is a fragmentary sectional view through the lamp casing and bracket on line II—II of Figure I.

Figure III is a perspective view of the bracket.

Figure IV is a view of the blank from which the bracket is formed.

In the drawings, similar reference numerals refer to similar parts throughout the several views, and the sectional views are taken looking in the direction of the arrows at the ends of the section lines.

This application is a division of my copending application, Serial Number 83,315, filed March 10, 1916.

In Figure I of the drawing, 5 represents a portion of an automobile headlight, side light, or the like, which is supported by a pair of brackets 6. These brackets are bent up from a blank 7 punched out of sheet metal, as for example, sheet steel. The central portion of the blank is bent back upon itself forming a U-shaped or bifurcated body portion having substantially parallel sides, the part 8 shown as semi-cylindrical in form. The portions 9 are turned outwardly, being bent on the dotted lines 10 to form base or supporting portions and each of these portions has a pair of raised portions 11 formed upon them. Portions 12, separated from portions 9 by slits 13, are bent on the dotted lines 14 to project inwardly and toward each other as shown in Figures II and III. These portions 12 have edges 15 which are arcs of circles and are so formed that when the portions 12 are bent into proper position these arc-shaped edges are concentric with the semi-cylindrical portions of the body and thus complete what may be termed an eye. These portions 12 also serve to space the sides of the body portion.

In assembling the bracket on the lamp casing, the body portion is passed through a suitable opening in the casing from the inside as shown in Figure II, a snug fit being desirable, and the bracket is then fixed to the lamp casing by spot welding at the raised portions 11 to the inner surface of the casing.

Having thus described my invention, what I claim as new and desire to secure by Letters Patent is:

1. A sheet metal mounting bracket comprising a body having a pair of parallel arms; base members at the free ends of said arms extending substantially at right angles thereto; and intermediate members secured to said body above said base members, and in contacting abutted relation to each other for spacing apart the arms of said body.

2. A sheet metal mounting bracket comprising a bifurcated body; supporting base members extending substantially at right angles to the body, and members on opposite edges of and integral with the arms of said bifurcated body above the base members and abutting each other in contacting relationship for spacing said arms and for forming an eye with the middle part of the body portion.

3. A sheet metal lamp supporting bracket comprising a substantially U-shaped body; a pair of outwardly turned base members and inwardly turned edge members integral with said body and above said base members adapted to form an eye at one end of the body for the reception of the supporting member, the ends of the edge members being in contacting relationship with each other.

4. A sheet metal lamp supporting bracket comprising a substantially U-shaped body; outwardly extending base members at the extremity of said body, and a plurality of displaced pairs of inwardly extending members integral with said body and having curved edges which are substantially concentric with the middle part of said body adapted to form bearings therewith, the ends of the pairs of the inwardly extending members being in contacting relationship with each other.

5. A supporting bracket having a bifurcated body, the base members extending approximately at right angles from the extremities of said body; and edge members extending inwardly from the end edge of each arm of said body and above the base members, the ends of said edge members being substantially in abutting relationship.

6. A sheet metal mounting bracket comprising a bifurcated body portion; base members extending substantially at right angles to said body; and means for preventing distortion of the arm of said bifurcated body relative to the base members, said means including integral inwardly directed plates on the side edges of the arms, the adjacent ends of which contact with each other.

In testimony whereof, I affix my signature.

HERMAN R. SAXON.